US012773088B2

(12) United States Patent
Büsing et al.

(10) Patent No.: US 12,773,088 B2
(45) Date of Patent: Oct. 27, 2026

(54) DISHWASHER

(71) Applicant: SAMSUNG ELECTRONICS CO., LTD., Suwon-si (KR)

(72) Inventors: Johannes Büsing, Suwon-si (KR); Jongwook Kwon, Suwon-si (KR); Jinhan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 18/456,238

(22) Filed: Aug. 25, 2023

(65) Prior Publication Data

US 2023/0404359 A1 Dec. 21, 2023

Related U.S. Application Data

(63) Continuation of application No. PCT/KR2022/004283, filed on Mar. 28, 2022.

(30) Foreign Application Priority Data

Apr. 16, 2021 (KR) ........................ 10-2021-0049649

(51) Int. Cl.
*A47L 15/42* (2006.01)
*A47L 15/48* (2006.01)
(Continued)

(52) U.S. Cl.
CPC ....... *A47L 15/4287* (2013.01); *A47L 15/4246* (2013.01); *A47L 15/48* (2013.01);
(Continued)

(58) Field of Classification Search
None
See application file for complete search history.

(56) References Cited

U.S. PATENT DOCUMENTS

2009/0119944 A1 5/2009 Lee et al.
2020/0100644 A1 4/2020 Kopera

FOREIGN PATENT DOCUMENTS

CN 108742458 A 11/2018
CN 210643962 U 6/2020
(Continued)

OTHER PUBLICATIONS

International Search Report and Written Opinion of the International Searching Authority dated Jul. 22, 2022, in connection with International Application No. PCT/KR2022/004283, 9 pages.
(Continued)

*Primary Examiner* — Levon J Shahinian

(57) ABSTRACT

A dishwasher is disclosed. The dishwasher according to an embodiment of the present disclosure comprises a tub and a temperature control device disposed at one side of the tub. The temperature control device comprises: a housing which forms a flow path; a heater which is coupled to one side of the housing; a switch which turns off the heater in response to the temperature of the fluid around the heater, which has reached a predetermined point, and includes a switch coupling coupled to the housing and a sensor protruding toward inside of the housing and configured to measure the temperature of the fluid; and a holder which is coupled to the housing and configured to fix the switch to the housing and cover the coupling part, wherein the sensor protrudes further toward the inside of the housing than the holder to measure the temperature of the fluid in the housing.

18 Claims, 13 Drawing Sheets

(51) Int. Cl.
*F26B 21/37* (2026.01)
*F26B 23/06* (2006.01)
*F26B 25/06* (2006.01)

(52) U.S. Cl.
CPC ............ *A47L 15/486* (2013.01); *F26B 21/37* (2026.01); *F26B 23/06* (2013.01); *F26B 25/06* (2013.01); *A47L 2401/18* (2013.01); *A47L 2501/11* (2013.01)

(56) References Cited

FOREIGN PATENT DOCUMENTS

| | | | |
|---|---|---|---|
| EP | 1578244 | B1 | 11/2009 |
| FR | 2491322 | A1 | 4/1982 |
| JP | 2011217812 | A | 11/2011 |
| JP | 2020058461 | A | 4/2020 |
| KR | 20-1996-0004222 | Y1 | 5/1996 |
| KR | 20-1997-0002816 | Y1 | 4/1997 |
| KR | 20-1997-0053505 | Y1 | 10/1997 |
| KR | 20-0215081 | Y1 | 5/2000 |
| KR | 10-0783428 | B1 | 12/2007 |
| KR | 20-0119428 | B1 | 12/2007 |
| KR | 10-0930566 | B1 | 12/2009 |
| KR | 10-1074704 | B1 | 10/2011 |

OTHER PUBLICATIONS

Office Action issued Jul. 27, 2026, in connection with Korean Patent Application No. 10-2021-0049649, 16 pages.

DISHWASHER

CROSS-REFERENCE TO RELATED APPLICATIONS

This application is a bypass continuation of International Application No. PCT/KR2022/004283, filed Mar. 28, 2022, which claims priority to Korean Patent Application No. 10-2021-0049649, filed Apr. 16, 2021, the disclosures of which are herein incorporated by reference in their entirety.

BACKGROUND

Field

The present disclosure relates to a dishwasher, and more particularly, to a dishwasher having a switch device with an improved structure.

Description of Related Art

In general, a dishwasher is an apparatus for spraying washing water at high pressure onto dishes accommodated therein to wash the dishes and drying the dishes. The dishwasher operates by spraying washing water at high pressure into the washing room accommodating dishes to cause the sprayed washing water to reach the dishes and thereby wash off foreign materials such as food residues remaining on the surfaces of the dishes.

More specifically, the dishwasher includes a washing operation, a rinsing operation, a drying operation, etc. During the drying operation, water remaining on dishes is evaporated, which may remain condensation water on the side walls of the tub. By using heated air during the drying operation, both a quick drying effect and a sterilizing effect are obtained.

To heat air, a heater is used, and to blow air heated by the heater, a fan is used. However, overheating of the heater results in damage of components of the dishwasher, located around the heater. Accordingly, there is a demand for preventing such damage upon use of a heater.

SUMMARY

An aspect of the disclosure provides a dishwasher capable of preventing overheating of a heater.

Another aspect of the disclosure provides a dishwasher capable of preventing components located around a heater from being damaged.

A dishwasher according to an embodiment of the disclosure includes: a tub; and a temperature control device positioned in one side of the tub, wherein the temperature control device includes: a housing; a flow path formed inside the housing and along which a fluid drawn from the tub flows; a heater coupled to one side of the housing; a switch configured to turn off the heater in response to identification that a fluid around the heater reaches a predetermined temperature, the switch including a switch coupling coupled to the housing and a sensor protruding toward an inside of the housing and configured to measure a temperature of the fluid; and a holder coupled to the housing and configured to fix the switch to the housing and cover the switch coupling, wherein the sensor protrudes further toward the inside of the housing than the holder to measure a temperature of the fluid inside the housing.

The switch coupling may be positioned between the holder and the housing and configured to couple to the holder, and the holder may include a hole corresponding to the sensor so that the sensor protrudes toward the inside of the housing.

The temperature control device may include a coupling member configured to couple the holder to the housing, and the sensor may protrude further toward the inside of the housing than the coupling member.

The coupling member may include a head protruding toward the inside of the housing and an inserting portion extending from the head and having a smaller cross section than the head, and the housing may include a boss protruding outward from the housing and configured to accommodate the inserting portion.

The holder may be positioned adjacent to the heater, be coupled to the switch coupling to transfer heat to the switch, and include a metal material.

The temperature control device may include a seal positioned between the holder and the housing.

The seal may include: a first seal positioned between the holder and the switch coupling and configured to seal between the holder and the switch coupling; and a second seal positioned between the holder and the housing and configured to seal between the holder and the housing.

The temperature control device may be positioned on a side wall of the tub.

The fluid may be air drawn from a washing room provided inside the tub into the temperature control device, and the temperature control device may include a fan positioned upstream of the switch and the heater inside the flow path and configured to draw air into the flow path.

The switch may be positioned upstream of the heater.

The temperature control device may include a temperature sensor positioned downstream of the heater and configured to measure temperature of air passing through the heater.

The fan, the switch, the heater, and the temperature sensor may be arranged in order from top to bottom.

The temperature control device may include an outlet provided below the temperature sensor and configured to discharge inside air of the housing.

A protrusion direction of the sensor may be parallel to a rotational axis direction of the fan.

The housing may further include: a first housing extending in a vertical direction and coupled to an outer side surface of the tub, and a second housing extending in the vertical direction to form the flow path and coupled to the first housing, and the holder may be positioned between the first housing and the second housing.

A dishwasher according to an embodiment of the disclosure includes: a tub forming a washing room; and a dryer positioned in a side wall of the tub, wherein the dryer comprises: a housing forming a flow path which inside air of the washing room enters, a heater coupled to one side of the housing and configured to dry inside air of the flow path, a switch coupled to the housing, positioned upstream of the heater, and configured to turn off the heater in response to identification that air around the heater reaches preset temperature, and a holder coupled to the housing and the switch to fix the switch to the housing, wherein the switch includes a switch coupling coupled to the housing, and a sensor protruding further toward an inside of the housing than the switch coupling and the holder.

The switch coupling ay be positioned between the holder and the housing to be coupled to the holder, and the holder may include a hole corresponding to the sensor such that the sensor protrudes toward the inside of the housing.

The dryer may include a coupling member configured to couple the holder to the housing, the coupling member including a head protruding to an inside of the flow path and an inserting portion protruding from the head toward an outside of the housing, the housing may include a boss protruding to the outside of the housing to accommodate the coupling member, and the sensor may protrude further to the inside of the housing than the head.

The switch may be positioned above the heater, and the dryer may include a fan positioned above the switch and the heater inside the flow path and configured to suck air into the flow path, and a temperature sensor positioned below the heater and configured to measure temperature of air passed through the heater.

A dishwasher according to an embodiment of the disclosure includes: a cabinet; a tub provided inside the cabinet and forming a washing room; and a dryer positioned in one side of the tub, wherein the dryer includes: a housing made of a plastic material, a heater coupled to the housing and configured to dry inside air of the housing, a thermostat coupled to the housing and configured to turn off the heater in response to identification that air around the heater reaches preset temperature, and a holder coupled to the housing and the thermostat to fix the thermostat to the housing, the holder being made of a metal material to transfer heat to the thermostat, wherein the thermostat includes a sensor protruding further toward inside of the housing than the holder.

According to a concept of the disclosure, there is provided a dishwasher capable of preventing components located around a heater from being damaged by preventing overheating of the heater.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
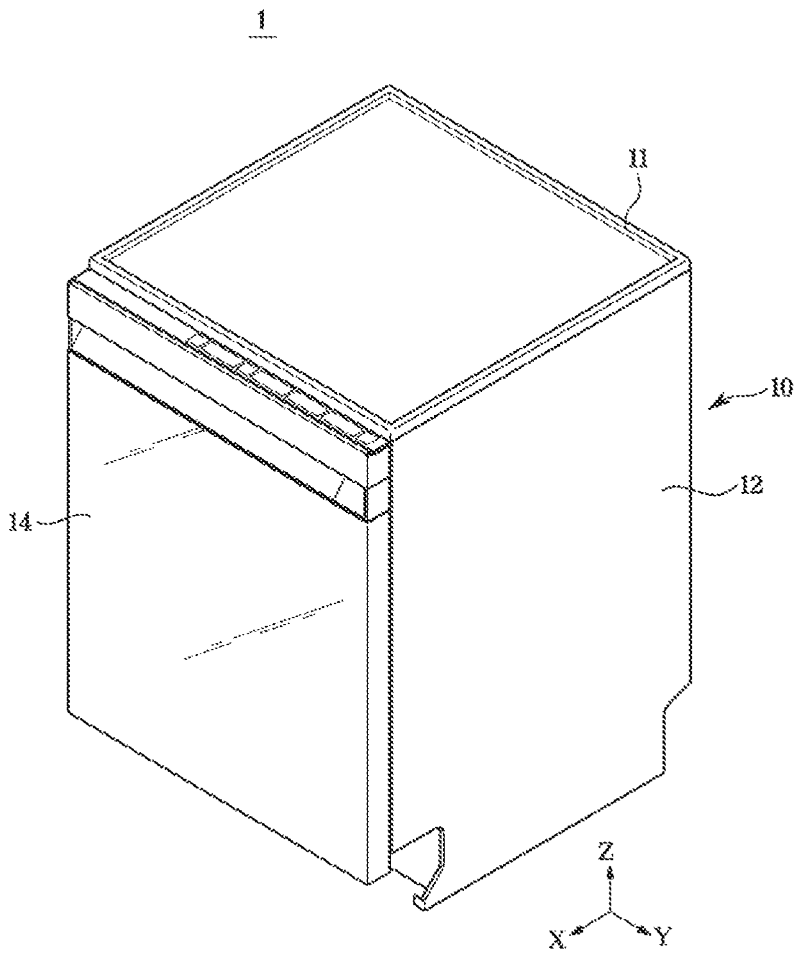
FIG. 1 is a perspective view showing a dishwasher according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

Also, the terms used in the present specification are merely used to describe the embodiments, and are not intended to limit and/or restrict the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front", "rear", "left", and "right" are defined based on the drawings, and the shapes and positions of the components are not limited by the terms.

Hereinafter, an embodiment of the disclosure will be described in detail with reference to the accompanying drawings.

Figure 2:
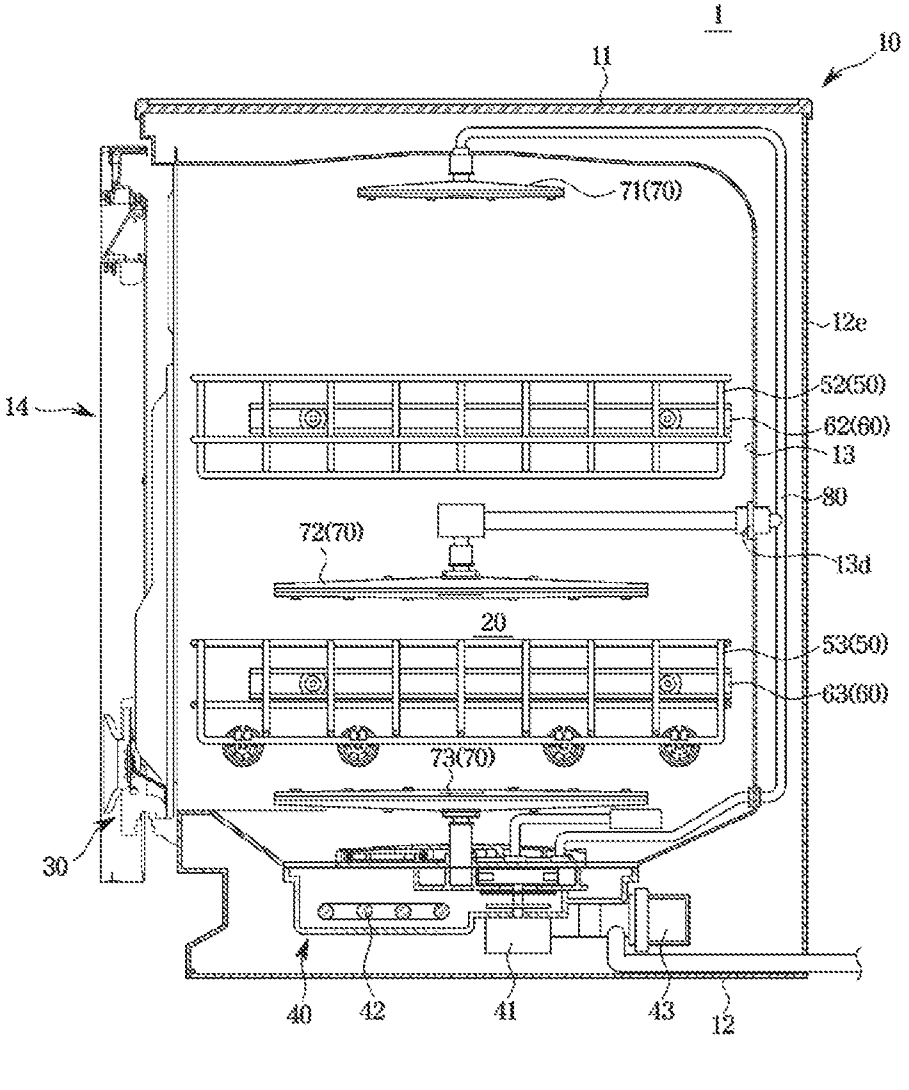
FIG. 2 is a side cross-sectional view of the dishwasher of FIG. 1.
Figure 3:
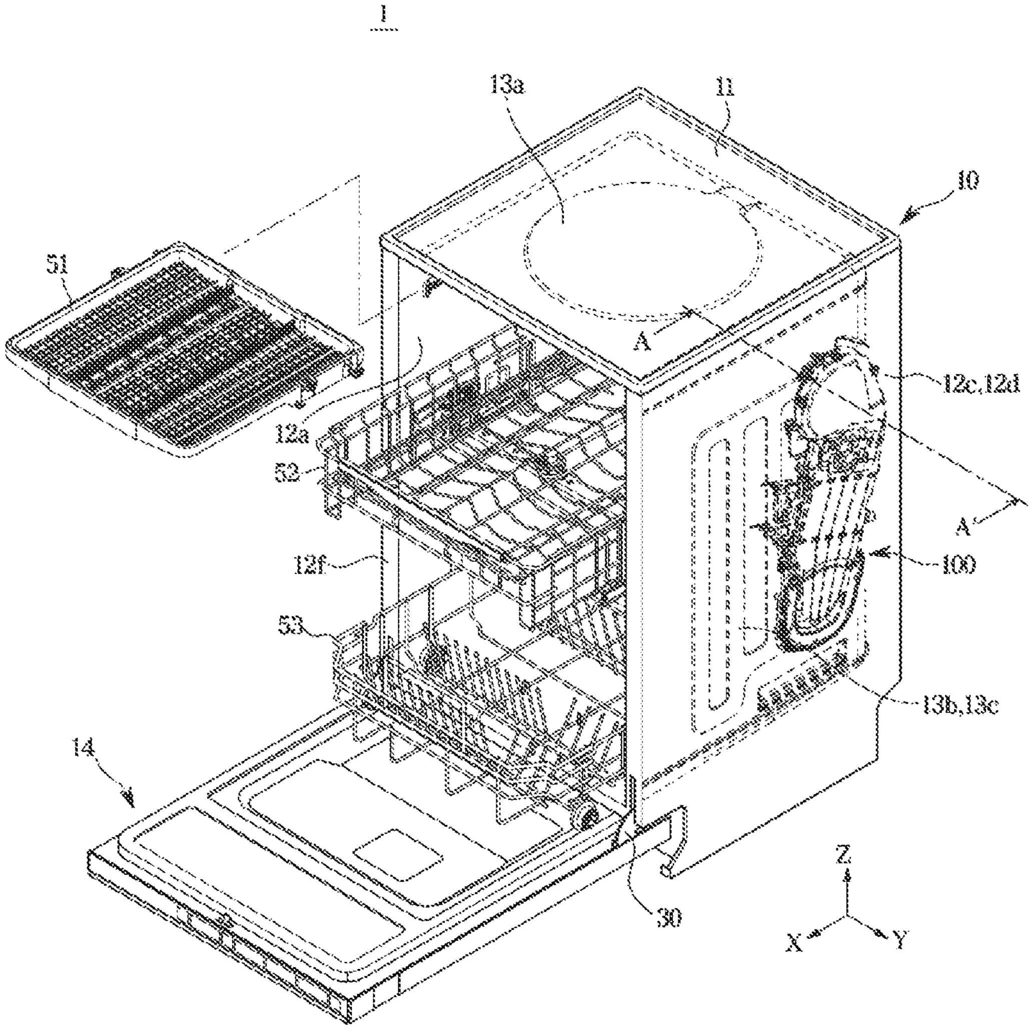
FIG. 3 is a perspective view showing a state in which a door opens in the dishwasher of FIG. 1.

FIG. 1 is a perspective view showing a dishwasher according to an embodiment of the disclosure. FIG. 2 is a side cross-sectional view of the dishwasher of FIG. 1. FIG. 3 is a perspective view showing a state in which a door opens in the dishwasher of FIG. 1.

Referring to FIGS. 1 to 3, a dishwasher 1 may include a main body 10. The main body 10 may include a cabinet 12 forming an appearance, a tub 13 positioned inside the main body 10 and forming a washing room 20, and a door 14 installed on the cabinet 12 and configured to open or close the tub 13. However, the dishwasher 1 may be a built-in type, and in this case, the cabinet 12 may be omitted.

The cabinet 12 may be substantially in a shape of a box. One side of the cabinet 12 may open. That is, the cabinet 12 may have an opening 12*a*. A front side of the cabinet 12 may open.

Each of the cabinet 12 and the tub 13 may be in a shape of a hexahedron having an opening such that one sides of the cabinet 12 and the tub 13 open substantially. The main body 10 may include a top cover 11 provided in an upper side of the cabinet 12.

The cabinet 12 may include a rear plate 12*e*, both side plates 12*c* and 12*d* extending in a front direction from both sides of the rear plate 12*e*, and a front plate 12*f* formed by being bent from both side plates 12*c* and 12*d*. The front plate 12*f* may form the opening 12*a* in the front side of the cabinet 12. The door 14 may open or close the opening 12*a* of the front plate 12*f*. An embodiment of the disclosure shows an example in which the front plate 12*f* extends from both side plates 12*c* and 12*d* to become one body, although not limited thereto.

The door 14 may be rotatably installed on the cabinet 12. The door 14 may be rotatably hinge-coupled to a lower end of the cabinet 12. The door 14 may be coupled to the cabinet 12 by a hinge device 30.

Inside the cabinet 12, a sump unit 40 provided below the tub 13 and collecting water to be used for washing, a plurality of baskets 50 which are withdrawable outward from inside of the cabinet 12 and on which dishes are put, a guide rack 60 supporting the plurality of baskets 50, and a plurality of spray nozzles 71, 72, and 73 for spraying water transferred from the sump unit 40 toward the dishes accommodated in the plurality of baskets 50 may be positioned.

In the plurality of baskets 50, dishes having relatively large volumes may be accommodated, although kinds and sizes of dishes that are accommodated in the plurality of baskets 50 are not limited. Dishes having relatively large or small volumes may also be accommodated in the plurality of baskets 50.

The plurality of baskets 50 may include a first basket 51, a second basket 52, and a third basket 53. The first basket 51 may be coupled to the tub 13 in an upper portion of the tub 13 to be positioned above the second basket 52 and the third basket 53. The first basket 51 may be positioned above the second basket 52. The second basket 52 may be coupled to the tub 13 in a middle portion of the tub 13 to be positioned below the first basket 51 and/or above the third basket 53. The third basket 53 may be coupled to the tub 13 in a lower portion of the tub 13 to be positioned below the first basket 51 and the second basket 52. The first basket 51 may be a sub basket 51 in which dishes having relatively small volumes are accommodated. Small cups such as espresso cups may be accommodated in the sub basket 51. However, kinds of dishes that are accommodated in the sub basket 51 are not limited to the above example.

The dishwasher 1 may include a first guide rack 61 on which the first basket 51 is supported, a second guide rack 62 on which the second basket 52 is supported, and a third guide rack 63 on which the third basket 53 is supported, in the tub 13. The guide racks 61, 62, and 63 may be rails for taking out the baskets 51, 52, and 53, respectively.

The first guide rack 61, the second guide rack 62, and the third guide rack 63 may be installed on an inner wall 13*b* and 13*c* of the tub 13 to enable the first basket 51, the second basket 52, and the third basket 53 to slide toward a front direction of the tub 13. For example, the guide rack 60 may be installed on a left wall 13*b* and a right wall 13*c* of the tub 13.

The first basket 51, the second basket 52, and the third basket 53 may slide in a front-rear direction of the tub 13 along the first guide rack 61, the second guide rack 62, and the third guide rack 63.

The sump unit 40 may be positioned at a center of a lower portion of the cabinet 12 to collect washing water used for washing. In the sump unit 40, a washing pump 41 for pumping stored water to a spray unit 70 may be installed. Washing water pumped by the washing pump 41 may be supplied to a first spray nozzle 71, a second spray nozzle 72, and a third spray nozzle 73 through a supply pipe 80.

The dishwasher 1 may further include a washing water heater 42 positioned below the cabinet 12 to heat washing water, and a drain pump 43 positioned below the tub 13 to drain washing water.

The dishwasher 1 may include the spray unit 70 for spraying washing water. The spray unit 70 may include the first spray nozzle 71 positioned above the first basket 51, the second spray nozzle 72 positioned below the first basket 51 and the second basket 52, that is, between the second basket 52 and the third basket 53, and the third spray nozzle 73 positioned below the third basket 53.

The first spray nozzle 71 may be rotatable. The first spray nozzle 71 may spray washing water toward dishes accommodated in the first basket 51 and/or the second basket 52. The second spray nozzle 72 may be rotatable. The second spray nozzle 72 may spray washing water toward dishes accommodated in the second basket 52 and the third basket 53. The third spray nozzle 73 may be rotatable. The third spray nozzle 73 may spray washing water toward the dishes accommodated in the third basket 53.

The dishwasher may include a dryer 100. The dryer 100 may be coupled to one wall of the tub 13. For example, the dryer 100 may be coupled to one of the side walls 13*b* and 13*c* of the tub 13. Accordingly, there is little possibility that water fallen from dishes upon a movement of the basket 50 will enter inside of the dryer 100. However, the dryer 100 may be coupled to an upper wall 13*a* or a rear wall 13*d* of the tub 13. The dryer 100 may lower relative humidity of air by heating inside air of the washing room 20. Details about this will be described below.

Figure 4:
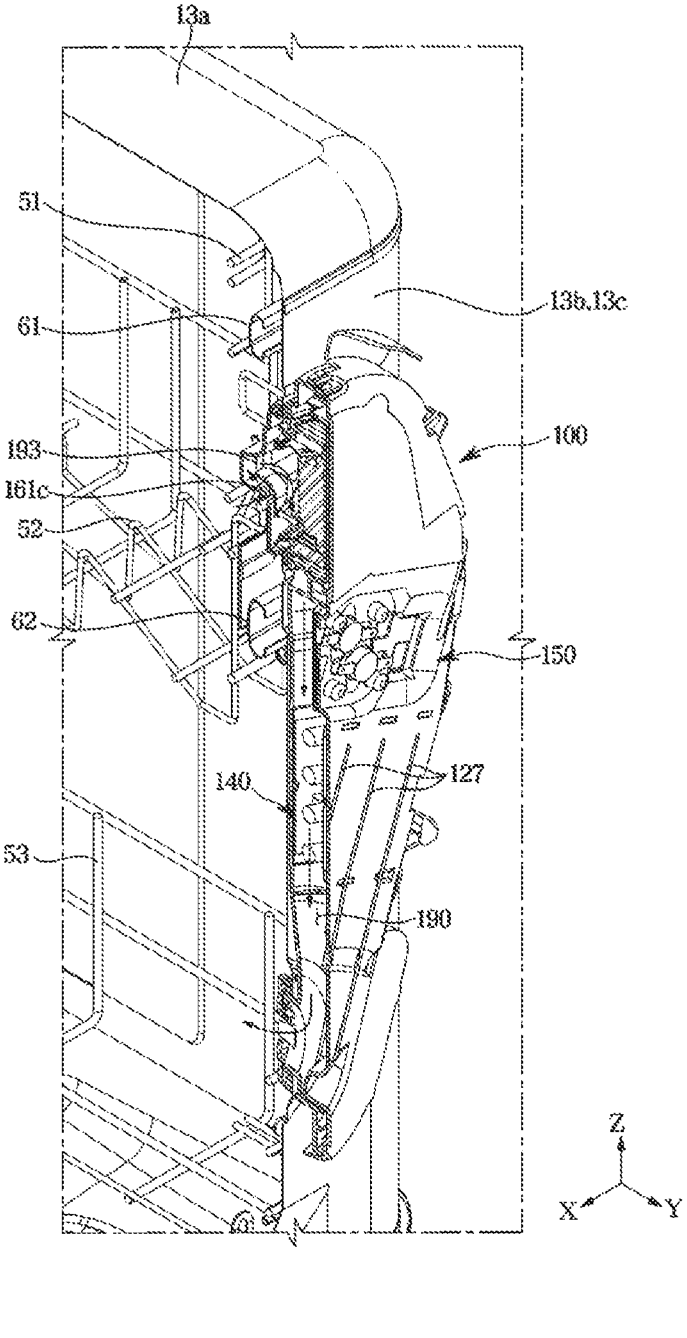
FIG. 4 is a cross-sectional perspective view of the dishwasher shown in FIG. 3.
Figure 5:
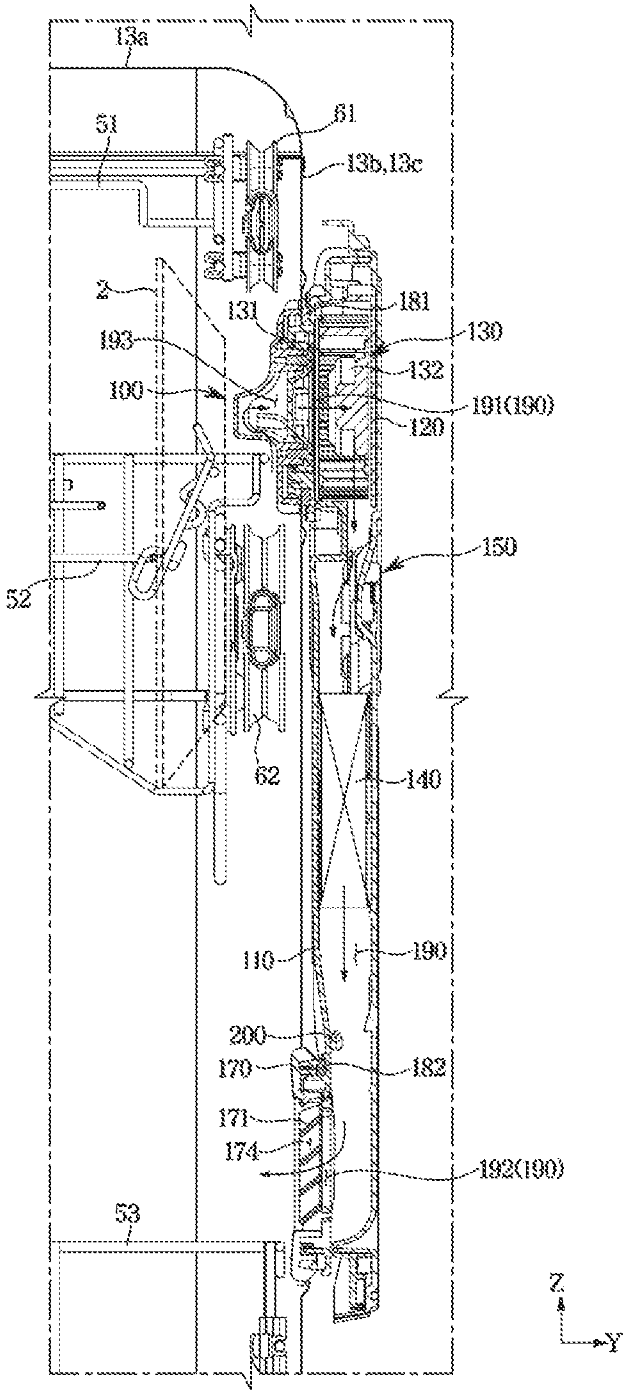
FIG. 5 is a cross-sectional view of the dishwasher shown in FIG. 4.

FIG. 4 is a cross-sectional perspective view of the dishwasher shown in FIG. 3. FIG. 5 is a cross-sectional view of the dishwasher shown in FIG. 4. FIGS. 4 and 5 show cross sections taken along A-A' of FIG. 3.

Referring to FIGS. 4 and 5, the dishwasher 1 may include the dryer 100. The dryer 100 may be positioned on the side wall 13*b* and 13*c* of the tub 13. For example, the dryer 100 may be positioned between an outer side surface of the tub 13 and an inner side surface of the cabinet 12. The dryer 100 may be coupled to the side wall 13*b* and 13*c* of the tub 13. The dryer 100 and an intake cover 161 may be positioned adjacent to the rear wall 13*d* of the tub 13. The baskets 51, 52, and 53 may be movable in the front-rear direction by the guide racks 61, 62, and 63, and because the intake cover 161 is positioned adjacent to the rear wall 13*d*, interference with movements of the baskets 51, 52, and 53 by the intake cover 161 may be minimized. More specifically, a dish 2 may be accommodated in the second basket 52, and the dish 2 may interfere with the intake cover 161 upon a movement in front-rear direction of the second basket 52. In this case, interference by the dish 2 upon the movement of the second basket 52 may be minimized because the intake cover 161 is adjacent to the rear wall 13*d*. A kind of the dish 2 is not limited to that shown in the drawings.

Also, the intake cover 161 may be positioned below the first guide rack 61 and/or above the second guide rack 62. The intake cover 161 may be positioned between the first guide rack 61 and the second guide rack 62. For example, the intake cover 161 may be positioned between the first basket 51 and the second basket 52. The position of the intake cover 161 may minimize interference with respect to movements of the first and second baskets 51 and 52.

Also, the dishwasher may include a height control device (not shown) positioned adjacent to the side walls 13*a* and 13*b* of the tub 13. The height control device may adjust a height at which the second basket 52 is inserted into the washing room 20. For example, the second basket 52 may be raised in height toward the first basket 51 or lowered in height toward the third basket 53. However, although the height of the second basket 52 changes, there may be no interference between the intake cover 161 and the second basket 52.

The dishwasher 1 may perform a washing operation of washing dishes in the washing room 20, a rinsing operation of rinsing foreign materials, etc. remaining on the dishes, and a drying operation of drying inside air of the washing room 20 after the rinsing operation. Inside air of the washing room 20 may have low relative humidity through the drying operation. In the present specification, air is described, although not limited thereto. However, embodiments of the disclosure may be applied in the same way to other fluids such as water.

Hereinafter, a process in which inside air of the washing room 20 is sucked into the dryer 100 and the air is discharged from the dryer 100 to the washing room 20 during a drying operation will be described.

According to a start of a drying operation, a fan 131 in the dryer 100 may rotate. The fan 131 may suck humid air in the washing room 20. The sucked air may flow to an intake 191 by passing through a plurality of inlet openings 161*c* of the intake cover 161 and an inlet space 193 provided between the intake cover 161 and the intake 191. A flow path 190 may include the intake 191 and an outlet 192. That is, air passed through the inlet space 193 may enter the flow path 190. The fan 131 may enable the sucked air to pass through the intake 191, the fan 131 positioned on the flow path 190, a switch device 150, a heater 140, and the temperature sensor 200 sequentially and then again flow into the washing room 20. The fan 131 may suck inside air of the washing room 20 into the flow path 190 and forcedly blow inside air of the flow path 190 such that the air flows through the switch device 150 and the heater 140 sequentially. The fan 131 may be positioned upstream of the switch device 150, the heater 140, and the temperature sensor 200. Accordingly, the fan 131 may blow air to the switch device 150 and the heater 140, and cause the air to flow to the washing room 20 through the outlet 192. For example, the fan 131 may be positioned above the switch device 150, the heater 140, and the temperature sensor 200. However, a location of the fan 131 is not limited to this.

The switch device 150 may turn off the heater 140 upon overheating of inside air of the flow path 190 by the heater 140. For example, due to a failure of the fan 131 or a motor 132, air may be not cooled and the heater 140 may continue to heat air. In this case, inside air of the flow path 190 may be overheated. In a case in which the heater 140 is not turned off, a housing 110 and 120 made with plastic may melt by the overheated air. To prevent this, a switch 151 of the switch device 150 may turn off the heater 140 in response to identification that air around the heater 140 reaches preset temperature. However, an operation of the switch device 150 is not limited to the above-described example. The switch device 150 may turn off the heater 140 according to overheating of the heater 140 although the fan 131 or the motor 132 does not break down.

The switch device 150 may be positioned upstream of the heater 140. For example, the switch device 150 may be positioned above the heater 140. Upon heating of air by the heater 140, the heated air may move upward. Accordingly, the switch device 150 may be positioned above the heater 140 to detect temperature of the heater 140 and turn off the heater 140 upon overheating of air. Accordingly, other components of the dishwasher 1 may be not damaged. However, a location of the switch device 150 is not limited to the above-described example.

The heater 140 may heat inside air of the flow path 190. Air heated by the heater 140 may have low relative humidity. The heater 140 may be positioned downstream of the switch device 150. For example, the heater 140 may be positioned below the switch device 150.

The temperature sensor 200 may be positioned downstream of the heater 140 to detect temperature of air heated by the heater 140. For example, the temperature sensor 200 may be positioned below the heater 140. However, a location of the heater 140 is not limited to the above-described example. The temperature sensor 200 may detect temperature of heated air and send a signal to a controller (not shown). Accordingly, the controller may control on-off of the heater 140 according to temperature of air.

In other words, inside air of the washing room 20 may enter the flow path 190 via the intake 191. Inside air of the flow path 190 may again flow to the washing room 20 through the outlet 192 via the fan 131, the switch device 150, the heater 140, and the temperature sensor 200. The outlet 192 may be formed at a lower portion of the housing 110 and 120, and enable condensation water provided inside the housing 110 and 120 to flow to the washing room 20.

A discharge port 174 may be formed in an inner side of an outlet cover 170, and a blade 171 may be provided in the discharge port 174. The blade 171 may be arranged such that inside air of the flow path 190 flows to a lower area of the tub 13. However, an arrangement of the blade 171 is not limited to this.

Figure 6:
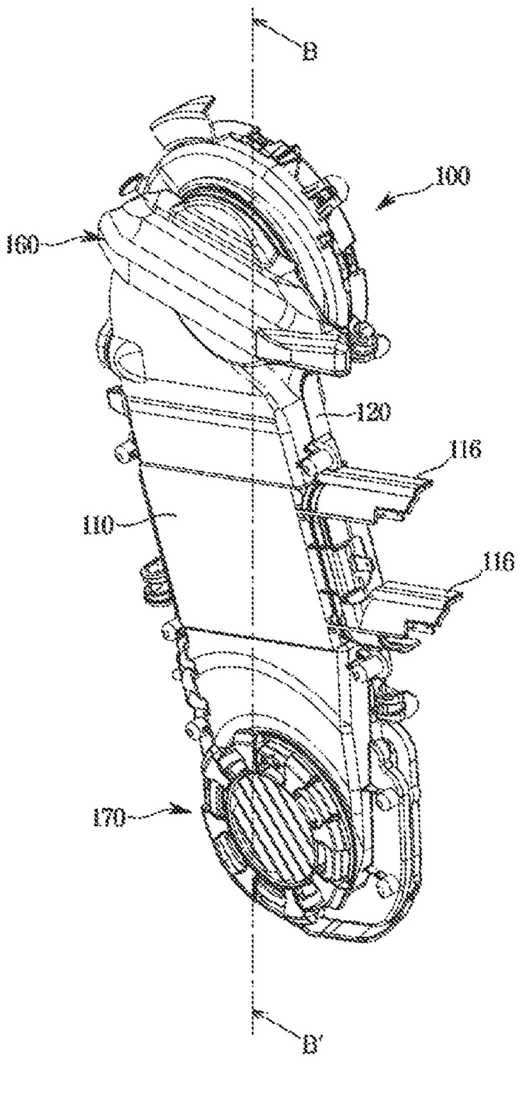
FIG. 6 is a perspective view showing a dryer in a dishwasher according to an embodiment of the disclosure.
Figure 7:
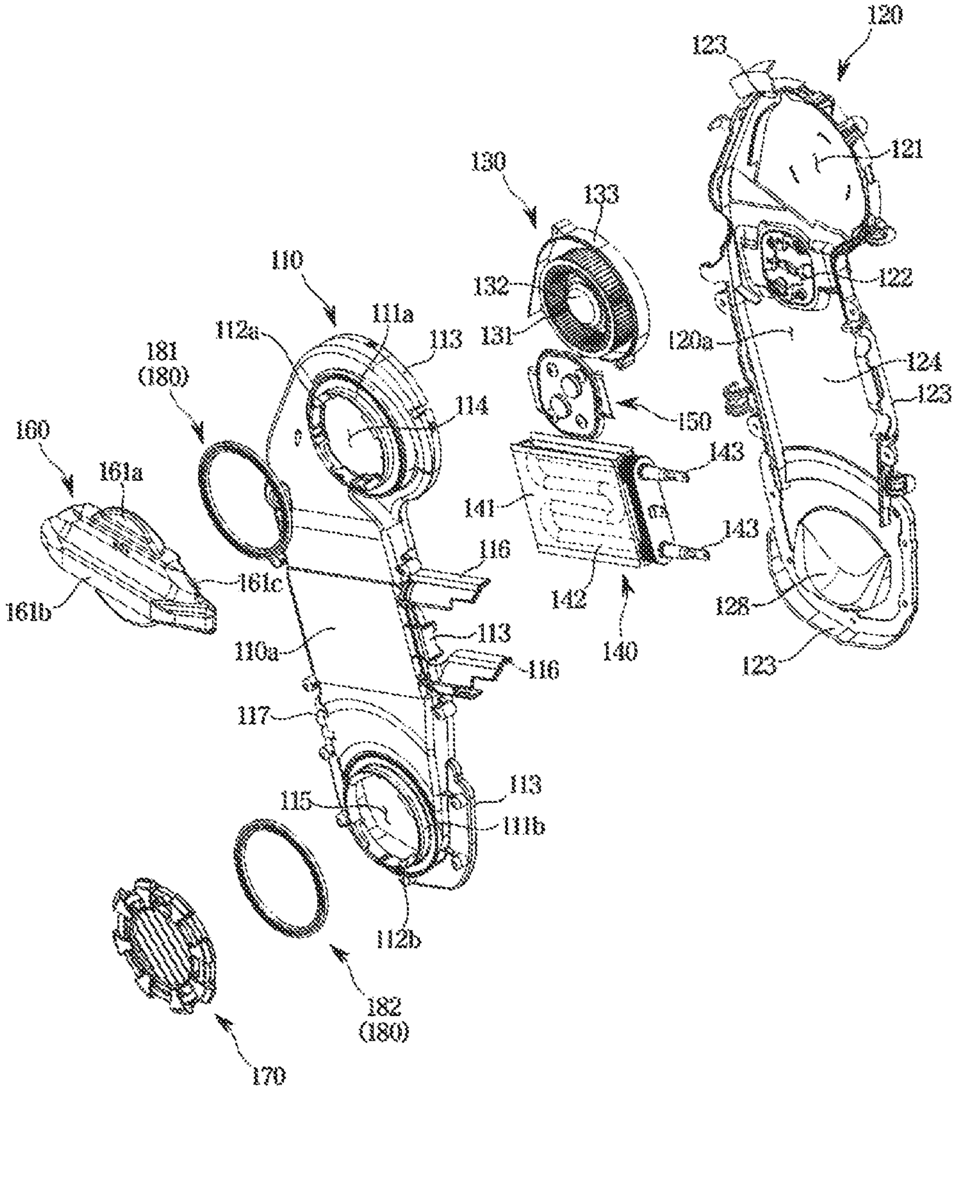
FIG. 7 is an exploded perspective view of the dryer of the dishwasher shown in FIG. 6.

FIG. 6 is a perspective view showing a dryer in a dishwasher according to an embodiment of the disclosure. FIG. 7 is an exploded perspective view of the dryer of the dishwasher shown in FIG. 6.

Referring to FIGS. 6 and 7, the dishwasher 1 may include the dryer 100. The dryer 100 may include the housing 110 and 120, a fan assembly 130, the heater 140, the switch device 150, and the flow path 190. However, some of the above-mentioned components may be omitted from the dryer 100. Also, the dishwasher 1 may include an intake cover assembly 160 and the outlet cover 170.

The housing 110 and 120 may extend in a Z direction. For example, the housing 110 and 120 may extend in an up-down direction to accommodate components of the dryer 100, such as the fan 131, the heater 140, and the switch device 150. Accordingly, because the housing 110 and 120 has a simple structure, generated condensation water may flow downward and be discharged to inside of the washing room 20. The housing 110 and 120 may include a first housing 110 and a second housing 120. The first housing 110 may be coupled to the second housing 120 to form the flow path 190 therein.

The first housing 110 may be coupled to the side wall 13*b* and 13*c* of the tub 13. The first housing 110 may be coupled to the side wall 13*b* and 13*c* of the tub 13 by theintake cover 161 and the outlet cover 170. For example, the intake cover 161 and the outlet cover 170 may be coupled to the first housing 110 by rotating.

The first housing 110 may include a base 110*a*, a cover coupling 111, an accommodating rib 112, a housing coupling 113, an intake port 114, an outlet port 115, a terminal protecting portion 116, and a temperature sensor accommodating portion 117.

The cover coupling 111 may include a first cover coupling illa coupled to the intake cover assembly 160, and a second cover coupling 111*b* coupled to the outlet cover 170. The cover coupling 111 may protrude from the base 110*a*, toward each cover. The cover coupling 111 may have a shape corresponding to the intake cover assembly 160 or the outlet cover 170. A cover seal 180 may be provided on an outer side of the cover coupling 111. The cover seal 180 may be positioned on the outer side of the cover coupling 111. The cover seal 180 may seal between the dryer 100 and the tub 13 upon coupling of the dryer 100 to the tub 13.

The cover seal 180 may seal between the dryer 100 and the tub 13 upon coupling of the dryer 100 to the tub 13. More specifically, upon coupling of the dryer 100 to the tub 13, the cover seal 180 may seal a coupling space between the dryer 100 and the tub 13. The cover seal 180 may seal a space between the tub 13 and the first housing 110. A plurality of cover seals 180 may be provided. For example, the plurality of cover seals 180 may include a first cover seal 181 that seals between the tub 13 and the first housing 110 upon coupling of the intake cover assembly 160 to the tub 13 and the first housing 110. Also, the plurality of cover seals 180 may include a second cover seal 182 that seals between the tub 13 and the first housing 110 upon coupling of the outlet cover 170 to the tub 13 and the first housing 110 (see FIG. 10).

The accommodating rib 112 may protrude from the cover coupling 111 in a direction toward inside of the intake port 114 or the outlet port 115. A plurality of accommodating ribs 112 may be provided. For example, the plurality of accommodating ribs 112 may include a first accommodating rib 112*a* protruding from one end of the first cover coupling 111*a* toward the inside of the intake port 114, and a second accommodating rib 112*b* protruding from one end of the second cover coupling 111*b* toward the inside of the outlet port 115.

Each of the accommodating ribs 112 may accommodate a coupling rib 162*c* provided at a coupling member 162 and a coupling rib 173 provided at the outlet cover 170. Accordingly, the intake cover assembly 160 and the outlet cover 170 may be coupled to the first housing 110, and the dryer 100 may be coupled to the side wall 13*b* and 13*c* of the tub 13 (see FIG. 10).

The first housing coupling 113 of the first housing 110 may be coupled to a housing coupling 123 of the second housing 120 to couple the first housing 110 to the second housing 120. A shape of the first housing coupling 113 is not limited to that shown in the drawings. Also, the first housing coupling 113 may be positioned at various locations, such as an upper portion, a middle portion, a lower portion, etc. of the first housing 110.

The intake port 114 may be formed to correspond to the intake 191 of the flow path 190, and the outlet port 115 may be formed to correspond to the outlet 192 of the flow path 190.

The terminal protecting portion 116 may extend in an X direction from the base 110*a*. For example, the terminal protecting portion 116 may extend in a front, upper direction (see FIG. 3). The terminal protecting portion 116 may protect a power connecting terminal 143 of the heater 140. The power connecting terminal 143 may be positioned toward the front, upper direction to prevent condensation water in the dryer 100 from flowing to the power connecting terminal 143.

The temperature sensor accommodating portion 117 may be formed at one side of the first housing 110. The temperature sensor accommodating portion 117 may accommodate the temperature sensor 200 in the first housing 110 such that the temperature sensor 200 detects temperature of inside air of the flow path 190.

The second housing 120 may be coupled to the first housing 110. The second housing 120 may include a base 120*a*, a fan accommodating portion 121, a switch device coupling 122, the housing coupling 123, a heater accommodating portion 124, a spacing rib 127, and a guide portion 128.

The fan accommodating portion 121 may accommodate the fan assembly 130. For example, a resting portion 133 of the fan assembly 130 may be accommodated in the fan accommodating portion 121. The fan accommodating portion 121 may be coupled to the resting portion 133 through a separate coupling member (not shown).

The switch device 150 may be coupled to the switch device coupling 122. Details about this will be described below. The heater 140 may be rested on the heater accommodating portion 124.

The spacing rib 127 may be formed on an outer side of the second housing 120. The spacing rib 127 may protrude from an outer surface of the second housing 120 toward the cabinet 12 (see FIG. 4). The spacing rib 127 may space the outer surface of the second housing 120 from an inner surface of the cabinet. For example, the spacing rib 127 may space the second housing 120 from the side plate of the cabinet. Accordingly, a space may be formed between the dryer 100 and the cabinet 12 to reduce transfer of heat generated by the heater 140 to the cabinet 12. Also, the spacing rib 127 may enable air to circulate to the space between the cabinet 12 and the dryer 100. A plurality of spacing ribs 127 may be provided. In the drawing, four spacing ribs 127 are shown. However, a number of the spacing rib 127 is not limited.

The guide portion 128 may guide inside air of the flow path 190 to flow to the inside of the washing room 20. The guide portion 128 may protrude toward the first housing 110.

The second housing coupling 123 may be coupled to the housing coupling 113 of the first housing 110 to couple the second housing 120 to the first housing 110. A shape of the second housing coupling 123 is not limited to that shown in the drawing. Also, the second housing coupling 123 may be positioned at various locations, such as an upper portion, a middle portion, a lower portion, etc. of the second housing 120.

The fan assembly 130 may include the fan 131, the motor 132, and the resting portion 133. The fan 131 may cause inside air of the washing room 20 to enter the flow path 190. The fan 131 may be positioned upstream of the switch device 150 and the heater 140 inside the flow path 190. For example, the fan 131 may be positioned at an upper area of the flow path 190 (see FIGS. 4 and 5). The fan 131 may be a centrifugal fan. However, a location and kind of the fan 131 are not limited to the above-described example. The motor 132 may be connected to the fan 131 to drive the fan 131. The fan resting portion 133 may cover the fan 131 and the motor 132 to rest the fan 131 and the motor 132 thereon. The fan resting portion 133 may be coupled to the fan accommodating portion 121 of the second housing 120.

The heater 140 may include a heater case 141, a sheath heater 142, and the power connecting terminal 143. The heater case 141 may be formed as one body to accommodate the sheath heater 142 therein. The heater case 141 may form an appearance of the heater 140 to protect the sheath heater 142 therein. The sheath heater 142 may be a tube type heater. Because the sheath heater 142 is used, the heater may cause no error in terms of functionality although condensation water exists inside the housings 110 and 120. For example, although condensation water is generated inside the housings 110 and 120 due to a washing operation or a rinsing operation before a drying operation, the heater 140 may cause no error in functionality. The power connecting terminal 143 may receive power from the dishwasher 1. The power connecting terminal 143 may be connected to both ends of the sheath heater 142 to operate the sheath heater 142. The power connecting terminal 143 may be positioned toward the front, upper direction. Accordingly, no condensation water may flow toward the terminal 143 (see FIG. 3).

The switch device 150 may turn off the heater 140 upon overheating of inside air of the flow path 190 by the heater 140. For example, due to a failure of the fan 131 or the motor 132, air may be not cooled and the heater 140 may continue to heat air. In this case, inside air of the flow path 190 may be overheated. In a case in which the heater 140 is not turned off, the housings 110 and 120 made with plastic may melt by the overheated air. To prevent this, the switch 151 of the switch device 150 may turn off the heater 140 in response to identification that air around the heater 140 reaches the preset emperature. However, an operation example of the switch device 150 is not limited to the above-described example. The switch device 150 may be positioned upstream of the heater 140 (see FIG. 5). For example, the switch device 150 may be positioned above the heater 140. Upon heating of air by the heater 140, the heated air may move upward. Accordingly, the switch device 150 may be positioned above the heater 140 to detect temperature of the heater 140 and turn off the heater 140 upon overheating of air. However, a location of the switch device 150 is not limited to the above-described example.

The intake cover 161 may cover the intake 191 of the flow path 190 and the intake port 114 of the first housing 110. The intake cover 161 may prevent foreign materials or washing water from entering the dryer 100 through the intake 191 during a washing operation or a drying operation. The intake cover 161 may include a base portion 161*a* and a protrusion 161*b*. The base portion 161*a* may cover the intake 191 to prevent foreign materials from entering the intake 191. The base portion 161*a* may be a cover portion 161*a*. The protrusion 161*b* may protrude from the base portion 161*a* toward the inside of the washing room 20 to form the inlet space 193. Inside air of the washing room 20 may enter the flow path 190 through the inlet space 193.

Figure 8:
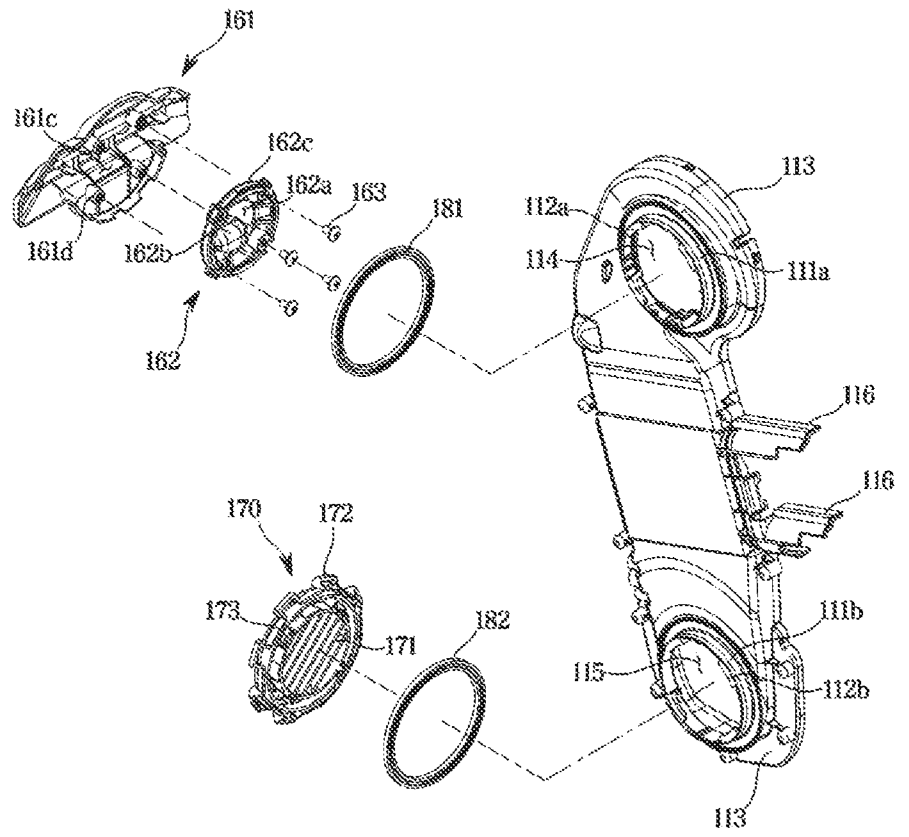
FIG. 8 is an exploded perspective view showing a coupling relation between an intake cover and a first housing and a coupling relation between an outlet cover and the first housing in the dryer of the dishwasher shown in FIG. 6.
Figure 9:
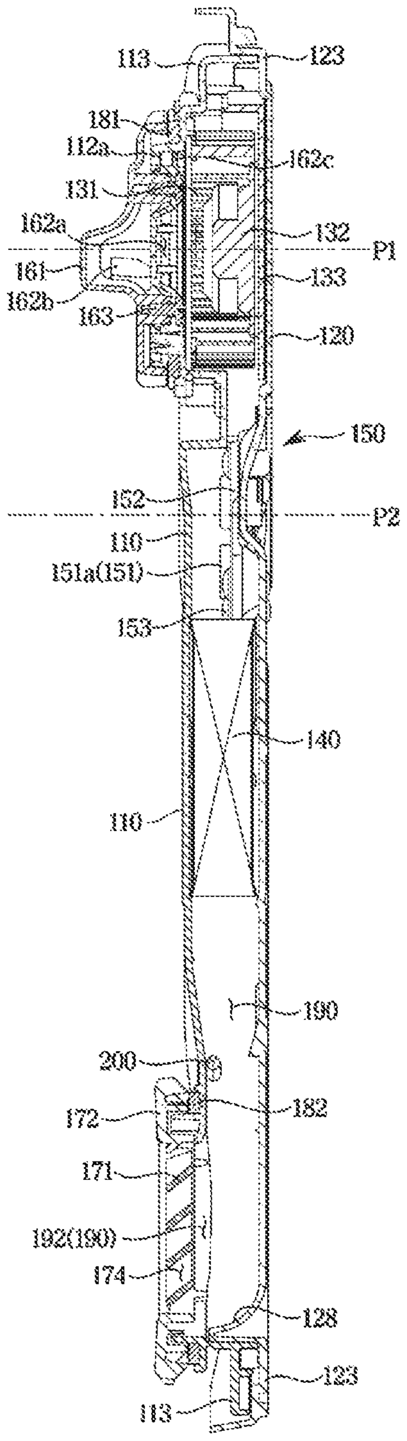
FIG. 9 is a cross-sectional view of the dryer shown in FIG. 6.

FIG. 8 is an exploded perspective view showing a coupling relation between an intake cover and a first housing and a coupling relation between an outlet cover and the first housing in the dryer of the dishwasher shown in FIG. 6. FIG. 9 is a cross-sectional view of the dryer shown in FIG. 6. FIG. 9 is a cross-sectional view of the dryer taken along B-B' of FIG. 6.

Referring to FIGS. 8 and 9, the intake cover assembly 160 may be coupled to the first housing 110 with the side wall 13*b* and 13*c* of the tub 13 in between (see FIGS. 4 and 5). Accordingly, the dryer 100 may be coupled to the side wall 13*b* and 13*c* of the tub 13.

The intake cover assembly 160 may be detachably coupled to the first housing 110. The intake cover assembly 160 may be coupled to the first housing 110 by rotating. For example, the intake cover assembly 160 may be coupled to the first housing 110 by rotating in a counterclockwise direction. Accordingly, a user may easily attach/detach the intake cover assembly 160 to/from the first housing 110.

The coupling rib 162*c* protruding outward from the coupling member 162 may be coupled to the first accommodating rib 112*a* of the first housing 110. Upon coupling of the intake cover assembly 160 to the first housing 110, the coupling rib 162*c* may interfere with the first accommodating rib 112*a* to prevent the intake cover assembly 160 from being separated from the first housing 110.

The intake cover assembly 160 may include the intake cover 161, the coupling member 162, and a coupling member 163. The intake cover 161 may be coupled to the coupling member 162 through the coupling member 163. The intake cover 161 may include a coupling 161*d* accommodating the coupling member 163. The coupling 161*d* may protrude toward the coupling member 162. A plurality of couplings 161*d* and a plurality of coupling members 163 may be provided. However, some of the above-described components may be omitted from the intake cover assembly 160. The coupling member 162 and the intake cover 161 may be integrated into one body.

The coupling member 162 may couple the first housing 110 to the intake cover 161. The coupling member 162 may be in a shape of a ring. The coupling member 162 may include an inlet port 162*a*, a preventing portion 162*b*, and the coupling rib 162*c*. The inlet port 162*a* may enable air received from the washing room 20 through the inlet openings 161*c* to flow to the flow path 190. For example, inside air of the washing room 20 may flow to the intake 191 by sequentially passing through the plurality of inlet openings 161*c*, the inlet port 162*a*, and the intake port 114. The preventing portion 162*b* may protrude toward the intake cover 161 to prevent foreign materials or washing water not air from being received through the inlet openings 161*c* provided at a lower portion of the intake cover 161. The coupling rib 162*c* may enable the intake cover assembly 160 to be coupled to the first housing 110. The coupling rib 162*c* may be provided on an outer side of the coupling member 162 to be accommodated by the accommodating rib 112. For example, according to coupling of the intake cover assembly 160 to the first housing 110, the accommodating rib 112 and the coupling rib 162*c* may be arranged in this order along a Y direction.

The outlet cover 170 may be coupled to the first housing 110 with the side walls 13*b* and 13*c* of the tub 13 in between. For example, the outlet cover 170 may be coupled to the first housing 110 by rotating in the counterclockwise direction. Accordingly, the dryer 100 may be coupled to the side wall 13*b* and 13*c* of the tub 13 because the intake cover assembly 160 and the outlet cover 170 are coupled to the first housing 110 and the tub 13 is positioned in between.

The outlet cover 170 may be coupled to the first housing 110 by rotating. For example, the coupling rib 173 may be coupled to the second accommodating rib 112*b* of the first housing 110.

The outlet cover 170 may include the blade 171, a circumferential protrusion 172, and the coupling rib 173. The coupling rib 173 may be formed on an outer side of the discharge port 174. A plurality of coupling ribs 173 may be provided along a circumferential direction of the outlet cover 170. The plurality of coupling ribs 173 may be spaced from each other. The coupling rib 173 of the outlet cover 170 may be coupled to the second accommodating rib 112*b* provided at the first housing 110. Upon coupling of the outlet cover 170 to the first housing 110, the coupling rib 173 of the outlet cover 170 may interfere with the second accommodating rib 112*b* to prevent the outlet cover 170 from being separated from the first housing 110. The coupling rib 173 may be provided at an outer side of the blade 171 to be accommodated by the second accommodating rib 112*b*. For example, the second accommodating rib 112*b* and the coupling rib 173 may be arranged in this order along the Y direction (see FIG. 10).

The dryer 100 may include the switch device 150. The switch device 150 may include the switch 151 including a sensor 151*a*, a holder 152 for fixing the switch 151 to the second housing 120, and a coupling member 153 for coupling the holder 152 to the second housing 120. The switch 151 may be positioned upstream of the heater 140 to turn off the heater 140 upon heating of inside air of the flow path 190 by the heater 140. For example, the switch 151 may be positioned above the heater 140, and according to an upward movement of heated air, the switch 151 may identify whether the air reaches the preset temperature. According to identification that the air reaches the preset temperature, the switch 151 may turn off the heater 140 to prevent overheating of air.

The intake 191 may be formed on the same axis as a rotation axis P1 of the fan 131. Accordingly, the fan 131 may smoothly suck air of the intake.

Also, the rotation axis P1 of the fan 131 may be parallel to an axial direction P2 of the switch 151.

Figure 10:
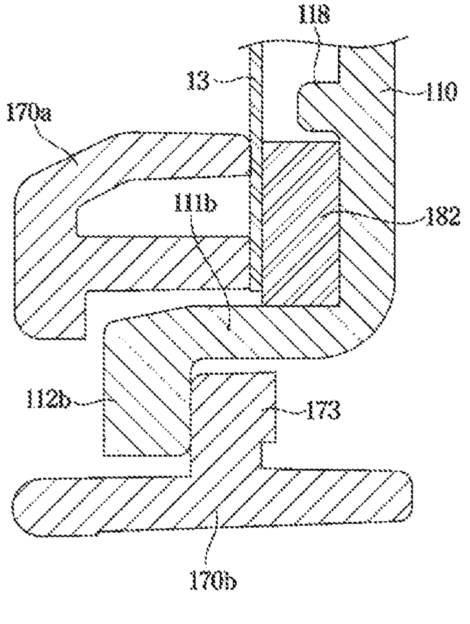
FIG. 10 is a schematic view showing a coupling relation of a tub, a dryer, and an outlet cover in the dishwasher of FIG. 1.

FIG. 10 is a schematic view showing a coupling relation of a tub, a dryer, and an outlet cover in the dishwasher of FIG. 1.

Referring to FIG. 10, the cover seal 180 may seal between the dryer 100 and the tub 13 upon coupling of the dryer 100 to the tub 13. More specifically, upon coupling of the dryer 100 to the tub 13, the cover seal 180 may seal a space between the tub 13 and the dryer 100. The cover seal 180 may seal a space between the tub 13 and the first housing 110. A plurality of cover seals 180 may be provided. For example, the plurality of cover seals 180 may include the first cover seal 181 that seals between the tub 13 and the first housing 110 upon coupling of the intake cover assembly 160 to the tub 13 and the first housing 110. Also, the plurality of cover seals 180 may include the second cover seal 182 that seals between the tub 13 and the first housing 110 upon coupling of the outlet cover 170 to the tub 13 and the first housing 110.

The dryer 100 may include an accommodating protrusion 118 protruding from the first housing 110 toward the outlet cover 170 to accommodate the cover seal 180. The accommodating protrusion 118 may prevent the cover seal 180 positioned between the tub 13 and the first housing 110 from departing between the tub 13 and the first housing 110.

A case in which the outlet cover 170, the tub 13, and the first housing 110 are coupled to each other will be described with reference to FIG. 10.

By coupling the outlet cover 170 to the first housing 110, the dryer 100 may be coupled to the tub 13. The second accommodating rib 112*b* may be coupled to the coupling rib 173 provided at the outlet cover 170. The outlet cover 170 may pull the dryer 100 toward the inside of the tub 13. For example, the coupling rib 173 of the outlet cover 170 may pull the second accommodating rib 112*b* formed in the first housing 110 toward the inside of the tub 13, that is, the inside of the washing room 20. Accordingly, the second cover seal 182 positioned between the tub 13 and the first housing 110 may be compressed, and the space between the tub 13 and the first housing 110 may be sealed.

The outlet cover 170 may include an outer circumferential portion 170*a* and an outer circumferential portion 170*b*. Upon pulling of the second accommodating rib 112*b* toward the inside of the tub 13 by the coupling rib 173, the second accommodating rib 112*b* may be positioned between the outer circumferential portion 170*a* and the inner circumferential portion 170*b* in the up-down direction.

Although a case in which the outlet cover 170 is coupled to the first housing 110 has been described with reference to the drawings, the intake cover assembly 160 may also be coupled to the first housing 110 by the same method. For example, the coupling rib 162*c* provided at the coupling member 162 may be coupled to the first accommodating rib 112*a*. The coupling member 162 may pull the dryer 100 toward the inside of the tub 13. For example, the coupling rib 162*c* of the coupling member 162 may pull the first accommodating rib 112*a* formed at the first housing 110 toward the inside of the tub 13, that is, toward the inside of the washing room 20. Accordingly, the first cover seal 181 positioned between the tub 13 and the first housing 110 may be compressed, and the space between the tub 13 and the first housing 110 may be sealed.

Also, according to coupling of the coupling rib 162*c* provided at the coupling member 162 to the first accommodating rib 112*a* and coupling of the coupling rib 173 provided at the outlet cover 170 to the second accommodating rib 112*b*, the dryer 100 may be coupled to the inner wall of the tub 13.

Figure 11:
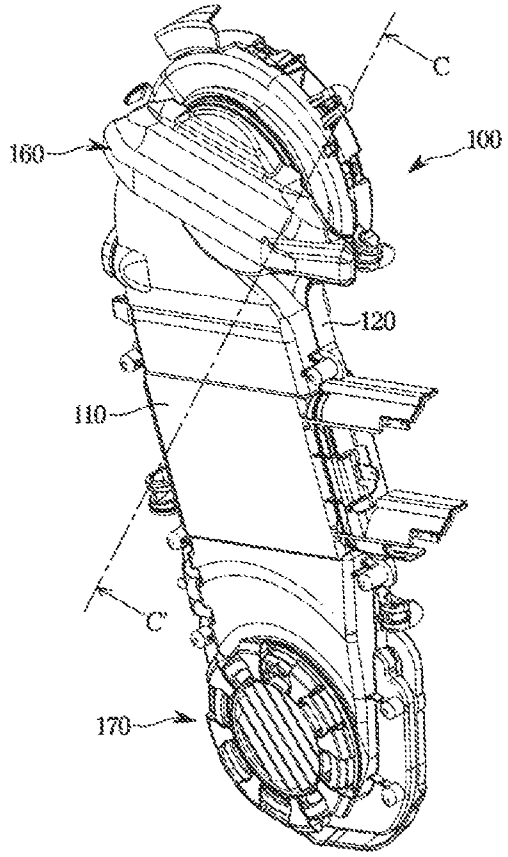
FIG. 11 is a perspective view showing a dryer in a dishwasher according to an embodiment of the disclosure.
Figure 12:
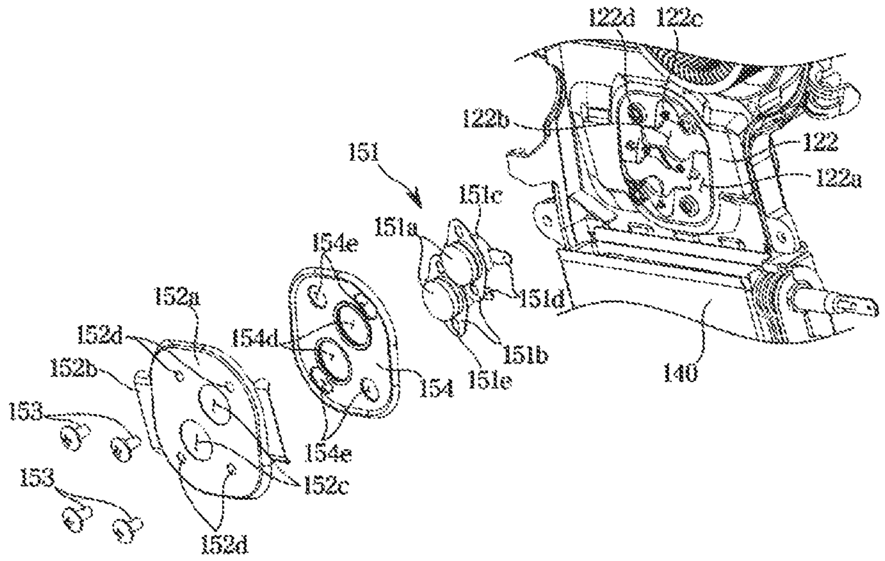
FIG. 12 is an exploded perspective view of the dryer of FIG. 11.
Figure 13:
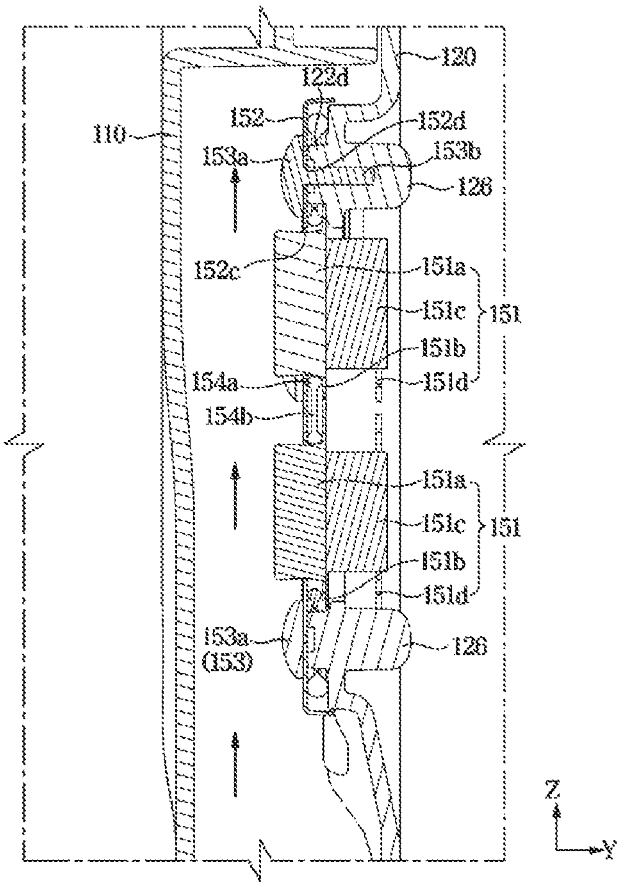
FIG. 13 is a cross-sectional view of the dryer of FIG. 11.

FIG. 11 is a perspective view showing a dryer in a dishwasher according to an embodiment of the disclosure. FIG. 12 is an exploded perspective view of the dryer of FIG. 11. FIG. 13 is a cross-sectional view of the dryer of FIG. 11. FIG. 13 is a cross-sectional view taken along C-C' of FIG. 11.

Referring to FIGS. 11 to 13, the dishwasher 1 may include the dryer 100. The dryer 100 may include the switch device 150. The dryer 100 may be also referred to as a temperature control device 100. The switch device 150 may include the switch 151, the holder 152, the coupling member 153, and a seal 154. However, some of the above-mentioned components may be omitted from the switch device 150.

The switch 151 may include the sensor 151*a*, a switch coupling 151*b*, a switching portion 151*c*, a terminal 151*d*, and a coupling hole 151*e*. The sensor 151*a* may be provided inside the flow path 190 to detect temperature of inside air of the flow path 190 and turn off the heater 140 upon overheating of air. For example, due to a failure of the fan 131 or the motor 132, air may be not cooled and the heater 140 may continue to heat air. Accordingly, inside air of the flow path 190 may be overheated. To prevent this, the switch 151 may turn off the heater 140 in response to identification that air around the heater 140 reaches the preset temperature.

At this time, the sensor 151*a* may detect temperature of air around the heater 140, and the switching portion 151*c* may turn on or off the heater 140. That is, the switching portion 151*c* may cut off power that is supplied to the heater 140.

The switch coupling 151*b* may be provided on an outer side of the sensor 151*a*, to couple the switch 151 to the holder 152 and the switch device coupling 122. For example, the switch coupling 151*b* may be positioned between the holder 152 and the switch device coupling 122 along the Y direction. The switch coupling 151*b* may be coupled to the second housing 120 by the coupling hole 151*e* provided in the switch coupling 151*b*. For example, the coupling hole 151*e* may be coupled to a coupling protrusion 122*c* of the second housing 120 to couple the switch 151 to the second housing 120.

The switching portion 151*c* may be exposed to outside of the flow path 190. The switching portion 151*c* may turn on or off the heater 140. The terminal 151*d* may be provided on an outer side of the switching portion 151*c*. The terminal 151*d* may connect the switch 151 to the controller (not shown) of the dishwasher 1.

A plurality of switches 151 may be provided. For example, the plurality of switches 151 may include a switch 151 for turning on or off the heater 140, and a switch 151 for completely turning off the heater 140. However, a number or function of the switch 151 is limited to the above-described example. For example, the heater 140 may be turned on/off or completely turned off by a single switch 151.

The holder 152 may fix the switch 151 to the housing. Also, the holder 152 may be made of a metal material to transfer temperature of air around the heater 140 to the sensor 151*a* of the switch 151. The holder 152 may be referred to as a heat sink 152.

The holder 152 may include a cover portion 152*a*, an extension portion 152*b*, a switch hole 152*c*, and a coupling member hole 152*d*. The cover portion 152*a* may cover the seal 154 and the switch coupling 151*b* of the switch 151. The cover portion 152*a* may be in a shape of a plate. The cover portion 152*a* may have a shape corresponding to the seal 154. The extension portion 152*b* may extend from both sides of the cover portion 152*a*. The extension portion 152*b* may be formed to correspond to the switch device coupling 122 of the second housing 120. The sensor 151*a* of the switch 151 may penetrate the switch hole 152*c*. The sensor 151*a* may protrude further toward the inside of the flow path 190 than the holder 152 through the switch hole 152*c*. The switch hole 152*c* may be a hole corresponding to the sensor 151*a* such that the sensor 151*a*, protrudes toward the inside of the housings 110 and 120. Because the sensor 151*a* protrudes further toward the inside of the flow path 190 through the switch hole 152*c*, overheating of the heater may be detected.

The coupling member 153 for coupling the holder 152, the seal 154, the switch 151, and the second housing 120 to each other may penetrate the coupling member hole 152*d*. The coupling member hole 152*d* may be formed to correspond to an inserting portion 153*b* of the coupling member.

The seal 154 may include a first seal 154*a*, a second seal 154*b*, a switch hole 154*d*, and a coupling member hole 154*e*. The first seal 154*a* may seal a space between the holder 152 and the switch 151. For example, the first seal 154*a* may seal a space between the holder 152 and the switch coupling 151*b*. Accordingly, the first seal 154*a* may prevent condensation water from entering between the switch coupling 151*b* and the holder 152. The second seal 154*b* may seal a space between the holder 152 and the second housing 120. For example, the second seal 154*b* may seal a space between the holder 152 and the switch device coupling 122. Accordingly, the second seal 154*b* may prevent condensation water from entering between the switch device coupling 122 and the holder 152. However, the seal is not limited to this. The seal 154 may seal a space between the coupling member 153 and the second housing 120. The sensor 151*a* of the switch 151 may penetrate the switch hole 154*d*. The coupling member 153 may penetrate the coupling member hole 154*e*. The coupling member hole 154*e* may be formed to correspond to the inserting portion 153*b* of the coupling member 153.

The coupling member 153 may couple the holder 152, the seal 154, the switch 151, and the second housing 120 to each other. One or more coupling members 153 may be provided. A number of the coupling member 153 is not limited to the example shown in the drawing.

The second housing 120 may include the switch device coupling 122. The switch device coupling 122 may be coupled to the switch 151, the seal 154, the holder 152, and the coupling member 153. The switch device coupling 122 may include a resting portion 122*a*, a switch hole 122*b*, the coupling protrusion 122*c*, and a coupling 122*d*. The switch 151 and the seal 154 may be rested on the resting portion 122*a*. The switch hole 122*b* may have a shape corresponding to the switching portion 151*c* and the terminal 151*d* to pass the switching portion 151*c* and the terminal 151*d* through. The coupling protrusion 122*c* may protrude from the second housing 120 toward the switch 151 to be coupled to the switch coupling 151*b* of the switch 151. The coupling 122*d* may have a shape corresponding to the inserting portion 153*b* of the coupling member such that the coupling member 153 is coupled to the second housing 120.

The second housing 120 may further include a boss 126. The boss 126 may accommodate the coupling member 153. For example, the boss 126 may accommodate the inserting portion 153*b*. The boss 126 may protrude outward from the second housing 120. For example, the boss 126 may protrude in the Y direction. Accordingly, because the boss 126 does not protrude to the inside of the flow path 190, the boss 126 may minimize interference with temperature detection by the sensor 151*a*.

Air entered the inside of the flow path 190 from the washing room 20 may pass through the fan 131. Air passed through the fan 131 may flow toward the switch device 150 positioned downstream of the fan 131. The heater 140 may be positioned downstream of the switch device 150. For example, the fan 131, the switch device 150, and the heater 140 may be arranged in this order along the Z direction (up-down direction).

Referring to FIG. 13, in a case in which the fan 131 or the motor 132 does not operate or the heater 140 operates abnormally, the heater 140 may be overheated. The switch 151 may turn off the heater 140 upon overheating of inside air of the flow path 190 by the heater 140. For example, due to a failure of the fan 131, air may be not cooled and the heater 140 may continue to heat air. At this time, inside air of the flow path 190 may be overheated. The switch 151 may be positioned above the heater 140, and upon heating of air by the heater 140, the heated air may move upward. According to an embodiment of the disclosure, the sensor 151*a* of the switch 151 may protrude further toward the inside of the flow path 190 than a head 153*a* of the coupling member 153. Because the sensor 151*a* protrudes further than the head 153*a*, the sensor 151*a* may be little obstructed upon measurement of temperature of air. Accordingly, the sensor 151*a* may measure temperature with high accuracy. Accordingly, the sensor 151*a* may rapidly measure temperature around the switch device 150 or the heater 140, and the switching portion 151*c* may turn off the heater 140. According to turning-off of the heater 140, air may be no longer heated. Accordingly, the housings 110 and 120 made of plastic may be prevented from melting and other components of the dishwasher 1 may be prevented from being damaged.

So far, specific embodiments have been shown and described. However, the disclosure is not limited to the above-described embodiments, and various modifications can be made by one of ordinary skill in the technical art to which the disclosure belongs without departing from the gist of the technical idea of the disclosure defined by the claims below.

Although the present disclosure has been described with various embodiments, various changes and modifications may be suggested to one skilled in the art. It is intended that the present disclosure encompass such changes and modifications as fall within the scope of the appended claims.

What is claimed is:

1. A dishwasher comprising:
a tub; and
a temperature control device positioned in one side of the tub,
wherein the temperature control device comprises:
a housing;
a flow path formed inside the housing and along which a fluid drawn from the tub flows;
a heater coupled to one side of the housing;
a switch positioned upstream of the heater configured to turn off the heater in response to identification that a fluid around the heater reaches a predetermined temperature, the switch including a switch coupling coupled to the housing and a sensor protruding toward an inside of the housing and configured to measure a temperature of the fluid before the fluid passes through the heater; and
a holder coupled to the housing and configured to fix the switch to the housing and cover the switch coupling; and
a temperature sensor positioned downstream of the heater and configured to measure temperature of air passing through the heater,
wherein the sensor protrudes further toward the inside of the housing than the holder to measure a temperature of the fluid inside the housing.

2. The dishwasher of claim 1, wherein:
the switch coupling is positioned between the holder and the housing and configured to couple to the holder, and
the holder includes a hole corresponding to the sensor so that the sensor protrudes toward the inside of the housing.

3. The dishwasher of claim 2, wherein:
the temperature control device includes a coupling member configured to couple the holder to the housing, and
the sensor protrudes further toward the inside of the housing than the coupling member.

4. The dishwasher of claim 3, wherein:
the coupling member includes a head protruding toward the inside of the housing and an inserting portion extending from the head and having a smaller cross section than the head, and
the housing includes a boss protruding outward from the housing and configured to accommodate the inserting portion.

5. The dishwasher of claim 1, wherein the holder is positioned adjacent to the heater, is coupled to the switch coupling to transfer heat to the switch, and includes a metal material.

6. The dishwasher of claim 1, wherein the temperature control device comprises a seal positioned between the holder and the housing.

7. The dishwasher of claim 6, wherein the seal comprises:
a first seal positioned between the holder and the switch coupling and configured to seal between the holder and the switch coupling; and
a second seal positioned between the holder and the housing and configured to seal between the holder and the housing.

8. The dishwasher of claim 1, wherein the temperature control device is positioned entirely on a side wall of the tub.

9. The dishwasher of claim 8, wherein:
the fluid is air drawn from a washing room provided inside the tub into the temperature control device, and
the temperature control device includes a fan positioned upstream of the switch and the heater inside the flow path and configured to draw air into the flow path.

10. The dishwasher of claim 9, wherein the fan, the switch, the heater, and the temperature sensor are arranged in order from top to bottom.

11. The dishwasher of claim 10, wherein the temperature control device includes an outlet provided below the temperature sensor and configured to discharge inside air of the housing.

12. The dishwasher of claim 9, wherein a protrusion direction of the sensor is parallel to a rotational axis direction of the fan.

13. The dishwasher of claim 8, wherein:
the housing further includes:
a first housing extending in a vertical direction and coupled to an outer side surface of the tub, and
a second housing extending in the vertical direction to form the flow path and coupled to the first housing, and
the holder is positioned between the first housing and the second housing.

14. A dishwasher includes:
a tub forming a washing room; and
a dryer positioned in a side wall of the tub, wherein the dryer comprises:
a housing forming a flow path which inside air of the washing room enters,
a heater coupled to one side of the housing and configured to dry inside air of the flow path,
a temperature sensor positioned below the heater and configured to measure temperature of air passed through the heater,
a switch coupled to the housing, positioned upstream of the heater, and configured to turn off the heater in response to identification that air around the heater reaches preset temperature, and
a holder coupled to the housing and the switch to fix the switch to the housing,
wherein the switch includes:
a switch coupling coupled to the housing, and
a sensor configured to measure a temperature of the air before the air passes through the heater, the sensor protruding further toward an inside of the housing than the switch coupling and the holder.

15. The dishwasher of claim 14, wherein:
the switch coupling is positioned between the holder and the housing to couple to the holder, and
the holder includes a hole corresponding to the sensor such that the sensor protrudes toward the inside of the housing.

16. The dishwasher of claim 15, wherein:

the dryer includes a coupling member configured to couple the holder to the housing, the coupling member including a head protruding to an inside of the flow path and an inserting portion protruding from the head toward an outside of the housing, the housing includes a boss protruding to the outside of the housing to accommodate the coupling member, and the sensor protrudes further to the inside of the housing than the head.

17. The dishwasher of claim 14, wherein:

the switch is positioned above the heater, and the dryer includes:

a fan positioned above the switch and the heater inside the flow path and configured to suck air into the flow path.

18. A dishwasher includes:

a cabinet;

a tub provided inside the cabinet and forming a washing room; and a dryer positioned in one side of the tub, wherein the dryer includes:

a housing made of a plastic material, a heater coupled to the housing and configured to dry inside air of the housing, a temperature sensor positioned downstream of the heater and configured to measure temperature of air passing through the heater, a thermostat coupled to the housing and configured to turn off the heater in response to identification that air around the heater reaches preset temperature, and a holder coupled to the housing and the thermostat to fix the thermostat to the housing, the holder being made of a metal material to transfer heat to the thermostat, wherein the thermostat includes a sensor configured to measure a temperature of the air before the air passes through the heater, the sensor protruding further toward an inside of the housing than the holder.

* * * * *